United States Patent
Sakakibara

(10) Patent No.: US 7,336,310 B2
(45) Date of Patent: Feb. 26, 2008

(54) PROCESSING APPARATUS

(75) Inventor: Manabu Sakakibara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 887 days.

(21) Appl. No.: 10/702,425

(22) Filed: Nov. 7, 2003

(65) Prior Publication Data

US 2004/0095493 A1 May 20, 2004

(30) Foreign Application Priority Data

Nov. 12, 2002 (JP) ............................. 2002-328366

(51) Int. Cl.
*H04N 5/335* (2006.01)
(52) U.S. Cl. ...................... 348/302; 348/312
(58) Field of Classification Search ................ 348/294, 348/312, 220.1, 302
See application file for complete search history.

(56) References Cited

U.S. PATENT DOCUMENTS

| | | | | |
|---|---|---|---|---|
| 4,750,041 A | * | 6/1988 | Vogel et al. ............. | 348/220.1 |
| 5,489,945 A | * | 2/1996 | Kannegundla et al. ...... | 348/521 |
| 6,130,420 A | * | 10/2000 | Tanaka et al. ........... | 250/208.1 |
| 6,614,477 B1 | * | 9/2003 | Lee et al. .................... | 348/312 |
| 6,618,085 B2 | * | 9/2003 | Ishimoto ..................... | 348/294 |
| 6,661,451 B1 | * | 12/2003 | Kijima et al. ............ | 348/220.1 |
| 6,677,991 B1 | * | 1/2004 | Ito ........................... | 348/220.1 |
| 6,809,770 B1 | * | 10/2004 | Ide .............................. | 348/312 |
| 6,822,689 B1 | * | 11/2004 | Nakakuki et al. ........... | 348/364 |
| 7,002,629 B2 | * | 2/2006 | Flynn ......................... | 348/312 |
| 2001/0050713 A1 | * | 12/2001 | Kibo et al. ................ | 348/220 |
| 2003/0122947 A1 | * | 7/2003 | Ishimoto ..................... | 348/312 |
| 2003/0189660 A1 | * | 10/2003 | Ishida et al. ................ | 348/312 |

* cited by examiner

*Primary Examiner*—Tuan Ho
*Assistant Examiner*—Pritham Prabhakher
(74) *Attorney, Agent, or Firm*—Fitzpatrick, Cella, Harper & Scinto

(57) ABSTRACT

A processing apparatus having a drive pulse generator circuit for generating a drive pulse to be supplied to an image pickup element, and a wave form data supply circuit for supplying wave form setting data for generating the drive pulse to the drive pulse generator circuit at each horizontal line, wherein the wave form setting data includes a wave form setting data to be set at each horizontal line and wave form setting data sharing a setting area.

1 Claim, 6 Drawing Sheets

PROCESSING APPARATUS

BACKGROUND OF THE INVENTION

1. Field of the Invention

The present invention relates to a processing apparatus for an image pickup element.

2. Related Background Art

A conventional method for driving an area type solid image pickup element is achieved in the manner illustrated in FIG. 6. An area image pickup element 101 is supplied with horizontal transfer pulses from a timing generator 909 and vertical transfer pulses via a vertical driver 105. An image picked-up signal is read out from the area image pickup element 101 and then supplied to an analog front end 103. The analog front end 103 sequentially performs correlated double sampling, gain adjustment and A/D conversion and supplies the processed result to a digital signal processor (DSP) 905. The digital signal processor 905 generates an image signal constituted of a luminance signal and color difference signals, from the supplied digital signals, and outputs the generated signal to an external via a terminal 107. The digital signal processor 905 operates in response to a clock generated by the timing generator 909, and generates HD/VD pulses of NTSC or PAL to return them to the timing generator 909. The timing generator 909 establishes frame synchronization by generating various read pulses for the area image pickup element 101 in accordance with the HD/VD pulses.

A conventional timing generator is designed only for each area image pickup element 101 and therefore is not compatible with other types of area image pickup elements. The timing generator is also required to be designed so as to handle not only a moving image taking mode but also a still image taking mode and a monitoring mode, in case that the image pickup element has the latter two modes in addition to the moving image taking mode. If there is any change in combination of image taking modes, it is necessary to redesign a timing generator, resulting in a high cost.

SUMMARY OF THE INVENTION

An object of the invention is to provide a processing apparatus capable of flexibly changing the driving timings for an image pickup element.

In order to attain this object, according to an embodiment of the present invention, a processing apparatus comprises a drive pulse generator circuit for generating a drive pulse to be supplied to an image pickup element and a wave form data supply circuit for supplying wave form setting data for generating the drive pulse to the drive pulse generator circuit at each horizontal line, wherein the wave form setting data includes a wave form setting data to be set at each horizontal line and wave form setting data sharing a setting area.

Other objects and features of the present invention will become apparent from the following description taken in conjunction with the accompanying drawings.

DESCRIPTION OF THE PREFERRED EMBODIMENTS

Figure 1:
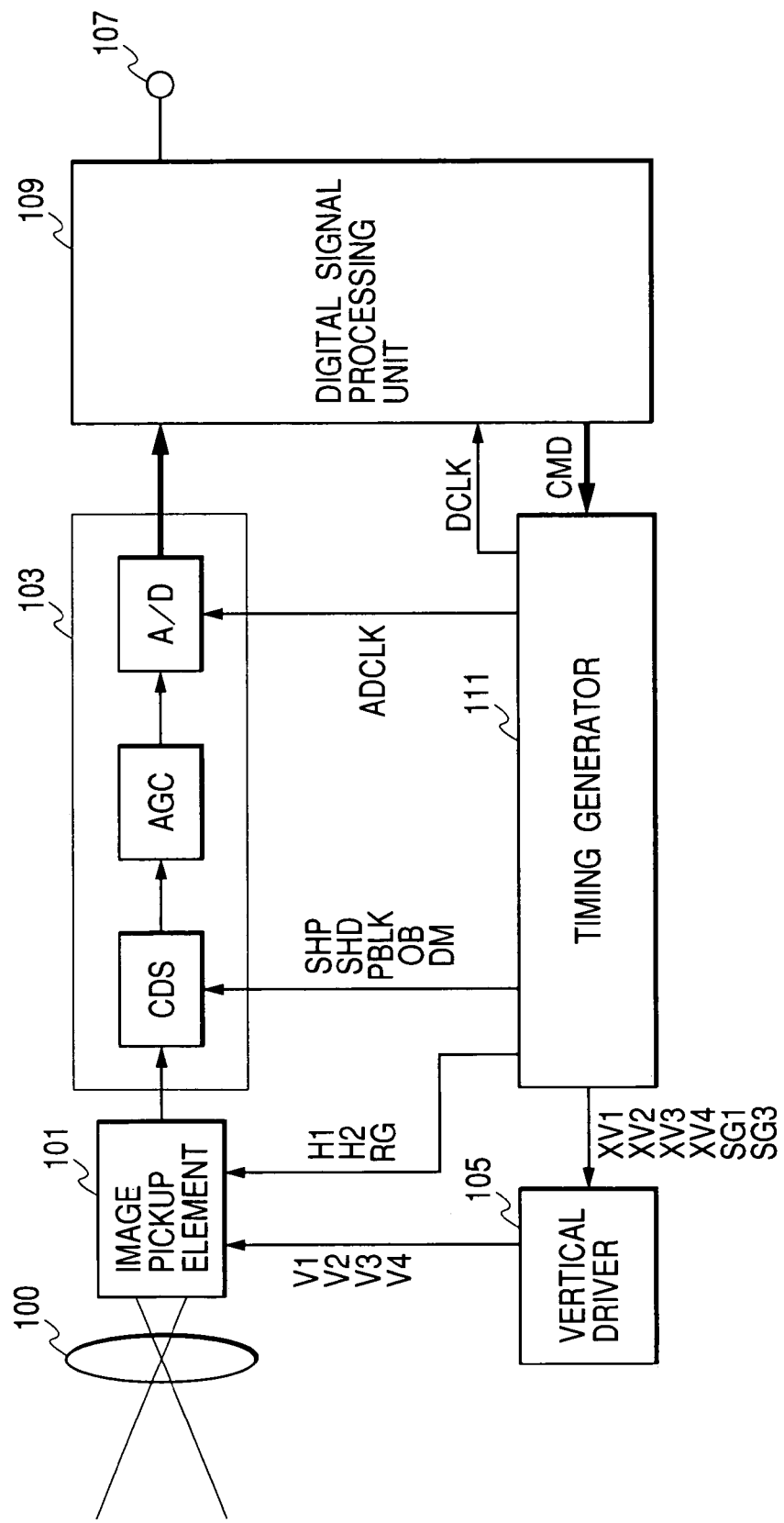
FIG. 1 is a diagram illustrating an example of a driving method and system to which the present invention is applied.

FIG. 1 is a diagram which best shows the features of this invention. In FIG. 1, reference numeral 100 denotes an optical lens. An area image pickup element 101 is supplied, as will be later detailed, with horizontal transfer pulses H1 and H2 and a reset gate pulse RG from a timing generator unit 111 and with vertical transfer pulses V1, V2, V3 and V4 from the timing generator unit 111 via a vertical driver 105. A signal picked up by the area image pickup element 101 are supplied to an analog front end 103 to be subjected to correlated double sampling (CDS), gain adjustment (AGC) and A/D conversion, in a manner similar to conventional techniques. This digitalized image signal is supplied to a digital signal processor (DSP) 109. Similar to a conventional manner, DSP 109 generates an image signal constituted of a luminance signal and color difference signals and outputs it to an external via a terminal 107. The DSP 109 shares a roll of generating various wave forms together with the timing generator unit 111.

Figure 2:
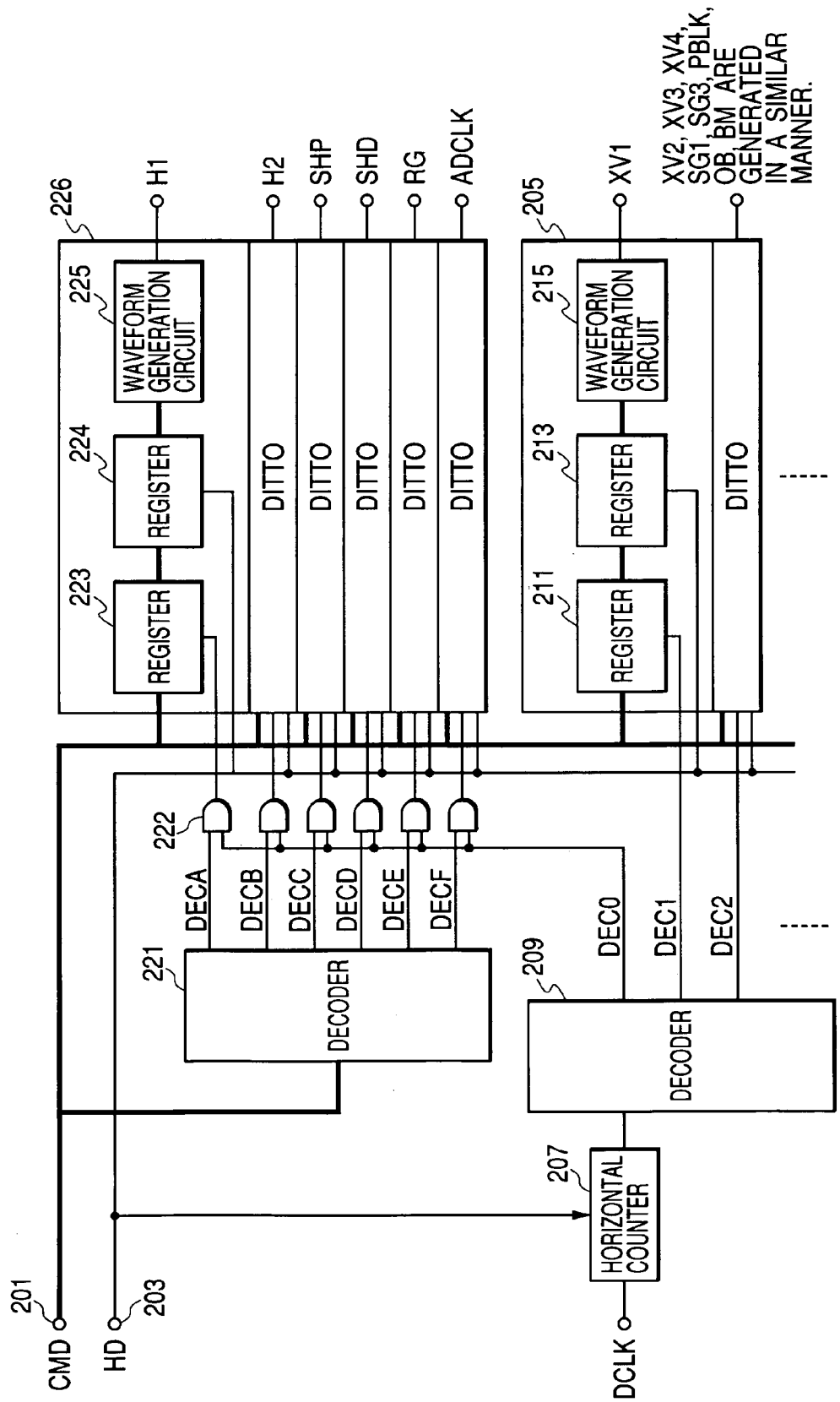
FIG. 2 is a diagram showing the details of a timing generator unit 111.

The details of the timing generator unit 111 are shown in FIG. 2. Reference numeral 201 denotes an input terminal at which a command (hereinafter abbreviated to CMD) supplied from the DSP 109 is received. Reference numeral 203 denotes an input terminal at which a horizontal timing signal (hereinafter abbreviated to HD) supplied from the DSP 109 is received. Reference numerals 205 and 226 denote a wave form generation block. Reference numeral 207 denotes a horizontal counter, reference numeral 209 denotes a decoder for decoding an output of the horizontal counter 207, reference numeral 221 denotes a decoder for decoding the highest level area of a CMD input, and reference numeral 222 denotes AND circuits. The wave form generation block 205 is constituted of registers 211 and 213 and a wave form generation circuit 215. Similarly, the wave form generation block 226 is constituted of registers 223 and 224 and a wave form generation circuit 225. The wave form generation block 205 generates the wave form of a vertical transfer pulse VX1. Similar blocks having the same internal structure as that of the block 226 are also provided for generating the wave forms of remaining four-phase vertical transfer pulses VX2, VX3 and VX4, sensor gate pulses SG1 and SG3 to be applied to the vertical transfer pulse, a PBLK pulse designating a pre-blanking portion (a mask-timing portion for blocking the horizontal transfer pulse near in the area where the vertical transfer pulse is generated), an OB pulse designating an optical black portion and a DM pulse designating a dummy pixel. These signal wave forms differ greatly depending upon an operation mode such as blanking and normal transferring. The wave form setting data is required as CMD at each horizontal period.

The wave form generation block 226 generates the wave form of the horizontal transfer pulse H1. Similar blocks having the same internal structure as that of the wave form generation block 226 are also provided for generating the wave forms of a remaining two-phase horizontal transfer pulse H2, correlated double sampling pulses SHP and SHD, a reset gate pulse RG for supplying a reference voltage of the image pickup element 101, and an ADCLK to be used for A/D conversion at the analog front end AFE 103. Since the internal structure of each of these blocks is the same as that of the wave form generation block 226, the description thereof is omitted. These signal wave forms are maintained constant irrespective of the operation mode such as blanking and normal transferring.

Figure 4:
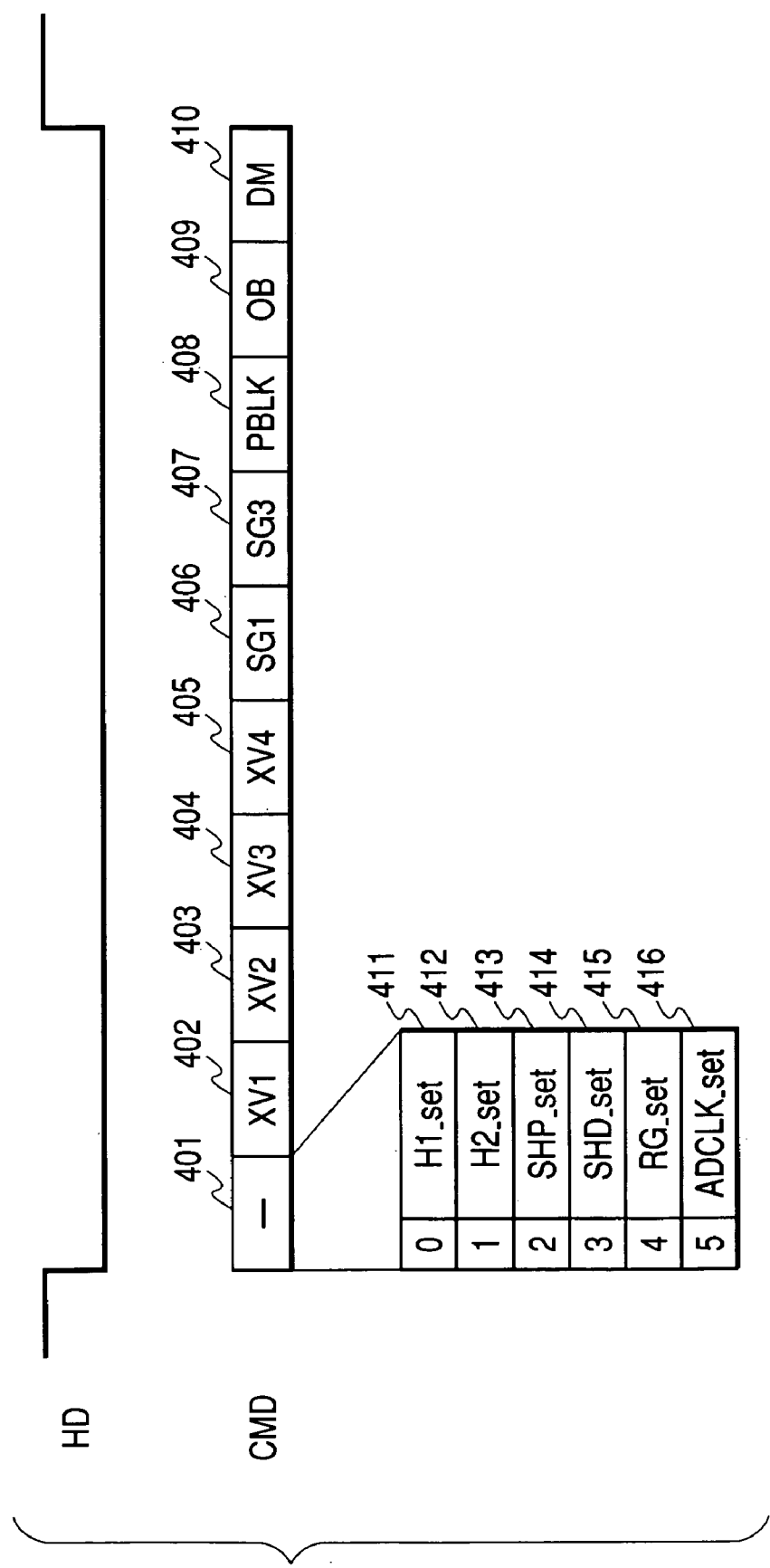
FIG. 4 is a diagram illustrating CMD data.

FIG. 4 is a diagram showing CMD data which is output starting at the trailing edge of the HD signal. Wave form setting data 401 to 409 are sequentially supplied in the order shown in FIG. 4. Reference numeral 401 denotes an area where flags 411 to 416 to be described later are selectively output at each horizontal synchronization. Reference numerals 402 to 410 denote data fields where signals XV1, XV2, XV3, XV4, SG1, SG3, PBLK, OB and DM are set respectively. The decoder 209 decodes the data in the data fields 401 to 409. Reference numerals 411 to 416 denote the flags "0" to "5" which are set to the upper (left) area and indicate the types of wave forms to be set. The flags "0" to "5" are used for H1, H2, SHP, SHD, RG and ADCLK, respectively. The decoder 221 decodes this upper area.

Referring to FIG. 4, the horizontal counter 207 is reset at the trailing edge of the HD signal input to the terminal 203, and counts up in response to each clock DCLK. The value of the horizontal counter are supplied to the decoder 209, wave form generation block 205 and AND circuits 222.

As to the area 401, the decoder 209 outputs DECO having a value "1" to the AND circuits 222 to release the masking of DECA to DECB. For example, when the flag 411 is set to the area 401, the decoder 221 outputs DECA so that the CMD data (H1_set) is written in the register 223 via the AND circuit 222. In response to the next HD trailing edge, the value in the register 223 is written in the register 224 to make the wave form generation circuit 225 generate the H1 waveform.

Figure 3:
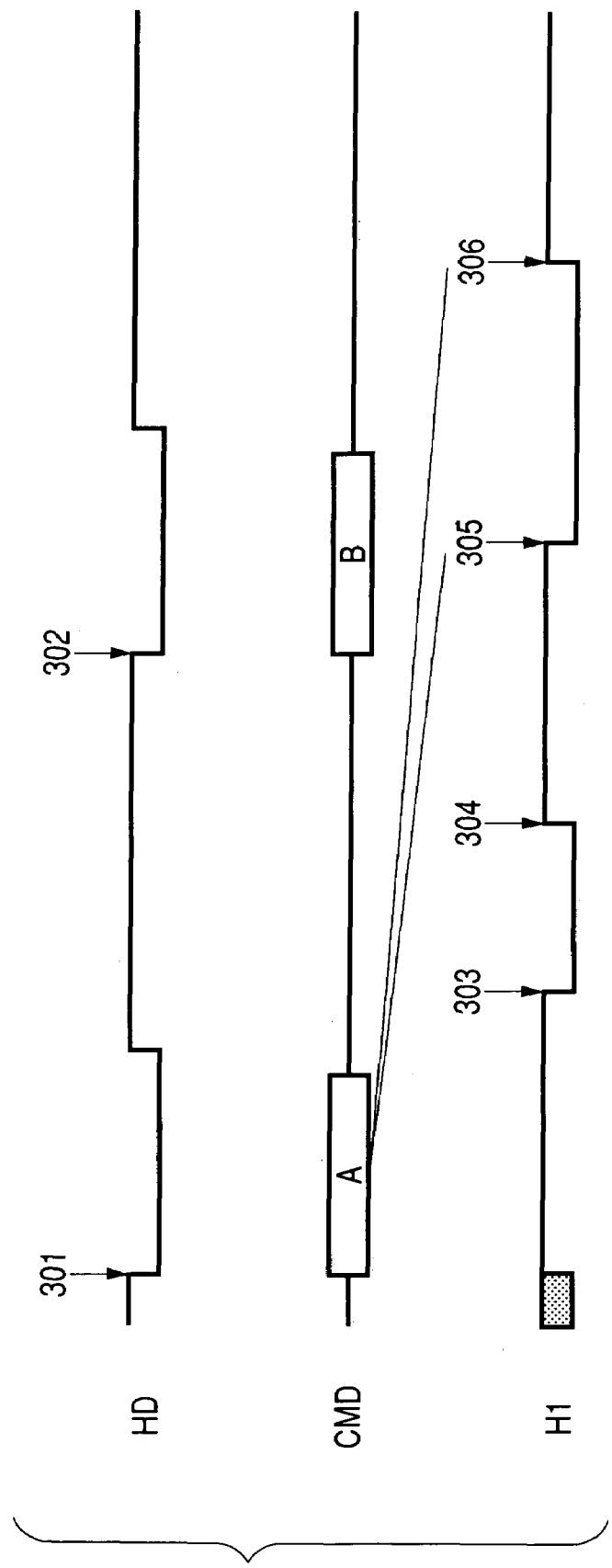
FIG. 3 is a diagram illustrating how a wave form generator circuit 225 generates a wave form.

The operation of generating each wave form is illustrated in FIG. 3. Reference numeral 302 denotes a trailing edge of the horizontal blanking signal. In response to this trailing edge, the wave form generation circuit 225 outputs an initial value. In the present embodiment, "1" is set to the initial value. Reference numeral 305 denotes a change point 1 upon which the contents of CMD[A] are reflected, and the wave form is inverted at this point 1. Similarly, reference numeral 306 denotes a change point 2 upon which the contents of CMD[A] are reflected, and the wave form is inverted again at this point 2. By repeating such an operation a plurality of times, a necessary wave form can be generated. If the number of change points is set to 0 or a greater value, a wave form not changing during the horizontal period can obviously be generated. Two change points per one horizontal period are sufficient for the mask pulse of the sensor gate pulse or horizontal transfer pulse.

The wave form generation circuit 225 is supplied with the count value from the horizontal counter 207 and with the initial value of a waveform to be described later and several change points (in this case, the change point 1 and change point 2) from the register 224. When the count value of the horizontal counter 207 takes "0", the wave form generation circuit 225 outputs the initial value. When the values of the change point 1 and horizontal counter become equal, the wave form generation circuit 225 inverts its output value. Similarly, when the values of the change point 2 and horizontal counter become equal, the wave form generation circuit 225 inverts its output value again. In this case, since the output is assumed to be a binary value, the same value is output when the level is inverted by even times.

For the vertical pulse VX1, i.e., for the area 402, the decoder 209 outputs DEC1 having a value "1" to the wave form generation block 205. Similar to the wave form generation block 226, the wave form generation block 205 writes the CMD data in the register 211 and writes it in the register 213 in response to the trailing edge of HD to make the wave form generation circuit 215 generate the waveform of VX1. The change points are prepared as many as necessary because the wave forms of vertical pulses (VX1, VX2, VX3 and VX4) and the like are complicated.

Figure 5:
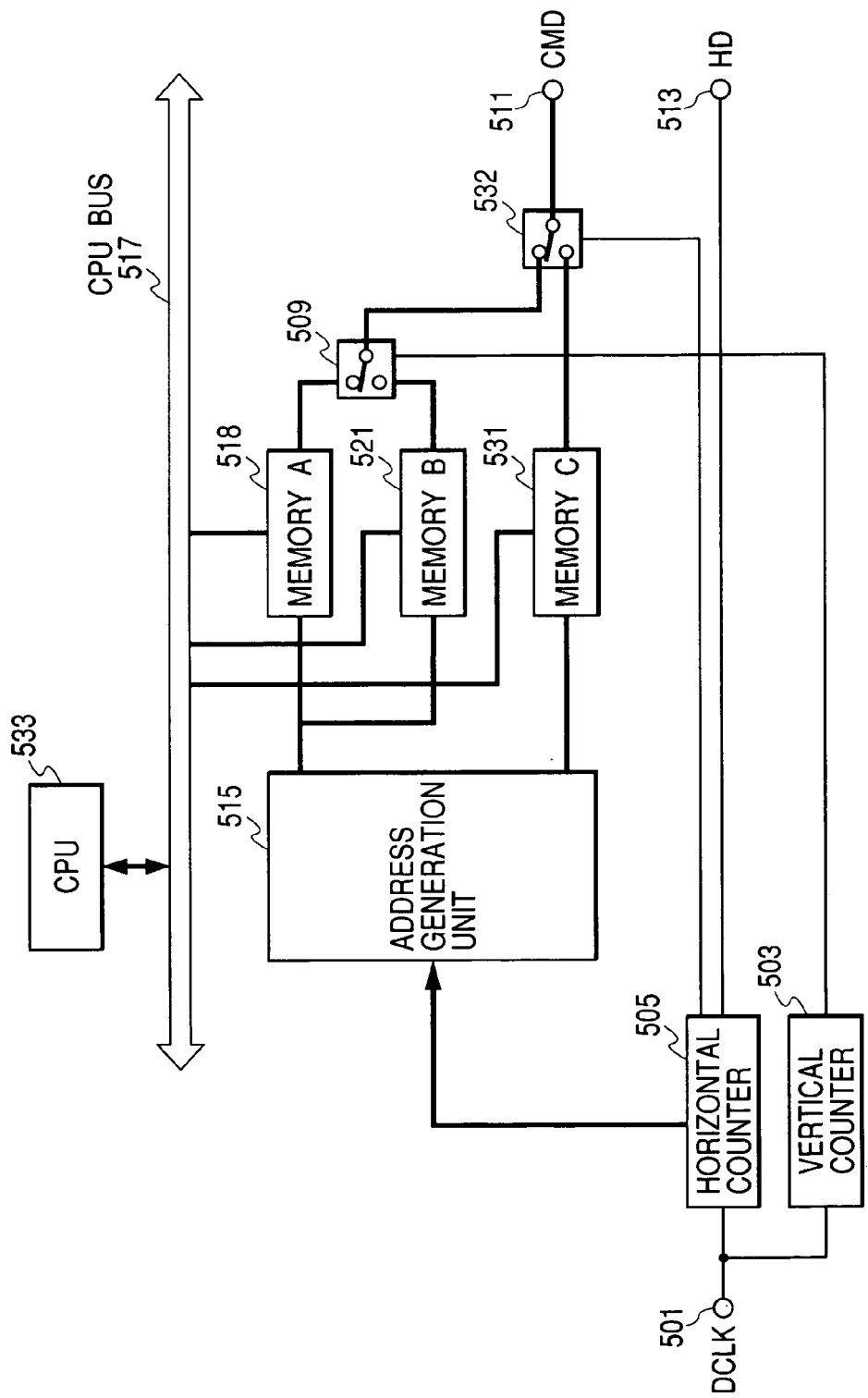
FIG. 5 is a diagram showing the structure of circuits for generating a wave form, the circuits being built in a DSP 109.
Figure 6:
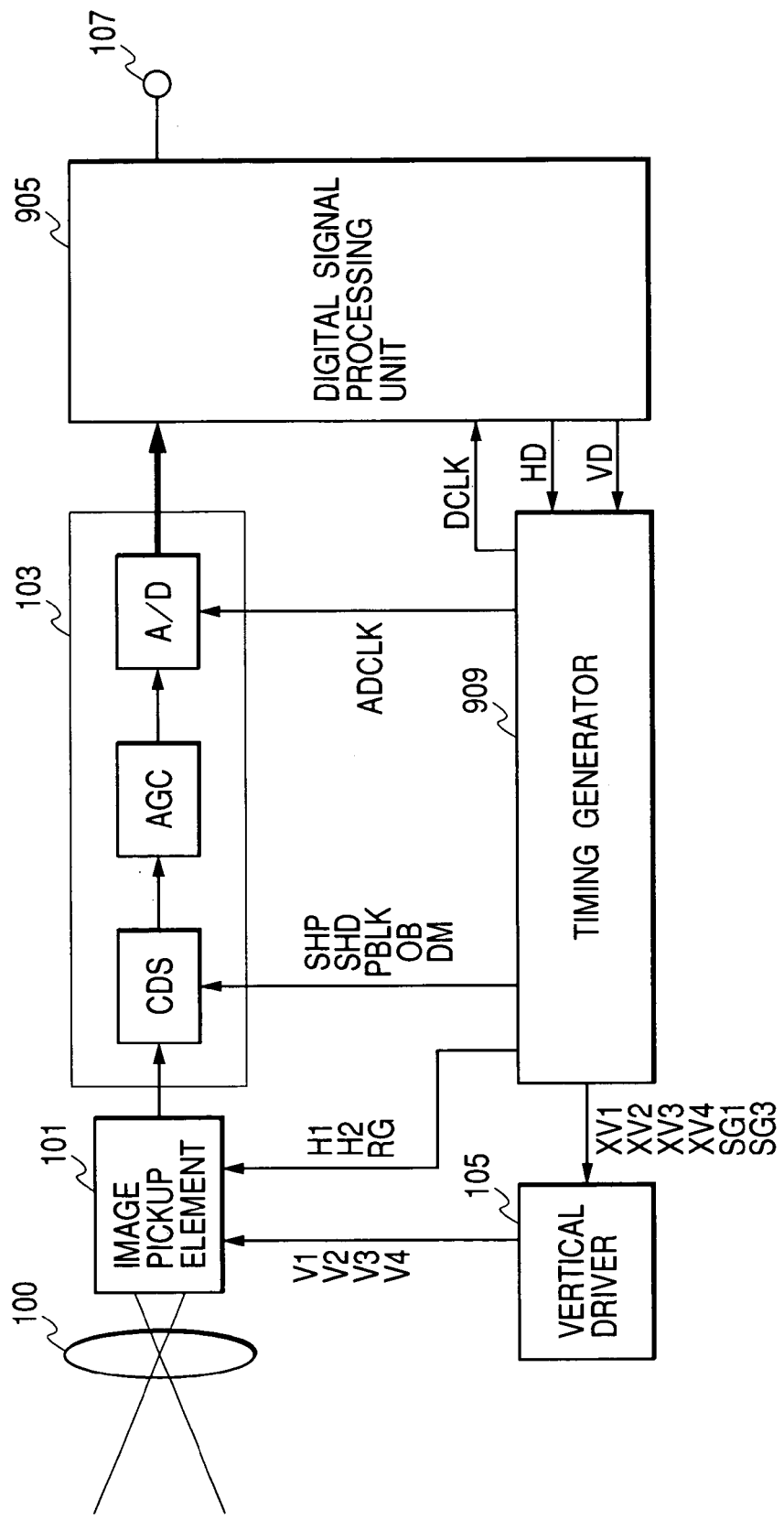
FIG. 6 is a diagram illustrating the structure of a conventional processing apparatus.

FIG. 5 shows the structure of wave form generating circuits built in DSP 109. Reference numeral 501 denotes an input terminal to which the clock DCLK is input, reference numeral 503 denotes a vertical counter, reference numeral 505 denotes a horizontal counter, reference numeral 509 denotes a switch, reference numeral 511 denotes a command output terminal, reference numeral 513 denotes an HD output terminal, reference numeral 515 denotes an address generation unit, reference numeral 517 denotes a microcomputer bus, reference numerals 519, 521 and 531 denote memories, reference numeral 532 denotes a switch and reference numeral 533 denotes a CPU. The vertical counter 503 and horizontal counter 505 are used for generating timings at which a two-dimensional image is read out from the area image pickup element 101. The count values of these two counters are supplied to the address generation unit 515. In accordance with the count values of the vertical and horizontal counters, the address generation unit 515 generates addresses and supplies them to the memories 519, 521 and 531. An output of the vertical counter 503 is inverted at each frame and applied to the switch 509 to alternately switch among the memories 519 and 521. The switch 509 is connected to one input terminal of the switch 532, and the other input terminal of the switch 532 is connected to an output terminal of the memory 531. In accordance with the count value of the horizontal counter 505, an output of the memory 531 is selected for the area 401 (FIG. 4) and the output of the switch 509 is selected for the other areas. In this manner, the CMD data is output to the CMD output terminal 511.

The horizontal counter 405 also generates the HD signal and outputs it to the terminal 513.

As shown in FIG. 3, at the terminals 511 and 513, CMD is output at the trailing edge of the horizontal blanking signal, and this output operation is terminated after the necessary number of CMDs is output. By terminating CMD near in the horizontal blanking period, it is possible to suppress minimally CMD data from leaking into an output of the area image pickup element to become noise sources.

With this arrangement described above, data of wave form data to be generated in the next frame is written in advance in one of the memories 519 and 521 presently not selected by the switch 509. At the next frame, the switch 509 is turned to the side of the thus-written wave form data. Data may be written in the memory 531 during the initial sequence such as a power-on or in each image pickup mode.

In the manner described above, the initial value for each of all wave forms to be generated during the horizontal period and the wave form data for predetermined number of change points for each waveform are read out and supplied to the wave form generation block 205 via the output terminal 511 and input terminal 201.

As described so far, the wave form data to be generated is loaded in the register 211 during the previous horizontal period. The memories of large scale is provided on the side of DSP 109 which is driven at a low voltage in a later process of the operation sequence, and only the horizontal counter is provided on the side of the timing generator unit 111 for generating drive pulses of the area image pickup element. It is therefore possible to flexibly deal with change of the area image pickup element, resulting in a reduction in development cost of a DSP and a timing generator unit.

Data for the next frame is written in the memories 519, 521 and 531, and during the next horizontal period, the next wave form data is written in advance in the timing generator unit 111 via DSP 109. With this arrangement, a versatile timing generator can be configured irrespective of the type of an area image pickup element. Even if a moving image pickup mode, a still image pickup mode and a monitor mode are all used, any one of these modes can be realized easily only by sequentially changing data to be written in the memories 519, 521 and 531.

For a versatile timing generator, a large amount of setting data is required in order to flexibly deal with a change in mode or timing, and it may happen in the worst case that the data may not be written within the horizontal blanking but may require the effective image area to be written, so that the image quality is degraded. According to the invention, however, wave form setting data which changes in the unit of line and data which does not change in the unit of line are used separately. The latter data shares the area of wave form setting values, so that it is possible to reduce the number of wave form setting data to be transferred in the unit of horizontal synchronization (line), thereby achieving to send necessary wave form setting values within a short horizontal blanking period. The invention is particularly effective for a versatile timing generator which requires to send a large number of wave form setting values.

Many widely different embodiments of the present invention may be constructed without departing from the spirit and scope of the present invention. It should be understood that the present invention is not limited to the specific embodiments described in the specification, except as defined in the appended claims.

What is claimed is:

1. A processing apparatus comprising:
   a drive pulse generator circuit for generating a drive pulse to be supplied to an image pickup element;
   a wave form data supply circuit for supplying wave form setting data for generating the drive pulse to said drive pulse generator circuit at each horizontal line;
   wherein the wave form setting data includes data to be set at each horizontal line and data sharing a setting area; and
   wherein the wave form setting data sharing the setting area includes wave form setting data and an identification code for identifying a type of the wave form setting data, and wherein said drive pulse generator circuit includes a first detection circuit which detects the wave form setting data with reference to a horizontal synchronization signal, and a second detection circuit which detects the wave form setting data in accordance with the identification code.

* * * * *